(12) United States Patent
Shank et al.

(10) Patent No.: US 6,902,118 B2
(45) Date of Patent: Jun. 7, 2005

(54) VEHICLE WINDSHIELD CLEANING SYSTEM

(75) Inventors: David Shank, Hersey, MI (US); John Washeleski, Cadillac, MI (US)

(73) Assignee: SBR Investments Company LLC, Reed City, MI (US)

( * ) Notice: Subject to any disclaimer, the term of this patent is extended or adjusted under 35 U.S.C. 154(b) by 99 days.

(21) Appl. No.: 10/653,827

(22) Filed: Sep. 3, 2003

(65) Prior Publication Data

US 2004/0118939 A1 Jun. 24, 2004

Related U.S. Application Data

(63) Continuation-in-part of application No. 10/269,647, filed on Oct. 11, 2002.
(60) Provisional application No. 60/415,552, filed on Oct. 2, 2002.

(51) Int. Cl.[7] ............................. B05B 1/24; B05B 17/04; B05B 1/10; B60S 1/46; B67D 5/62
(52) U.S. Cl. .................... 239/13; 239/284.2; 239/284.1; 222/146.5
(58) Field of Search ................................ 239/13, 284.1, 239/284.2, 128, 130, 135; 222/146.5, 146.2, 146.1

(56) References Cited

U.S. PATENT DOCUMENTS

| 4,090,668 | A | * | 5/1978 | Kochenour | .................. 239/130 |
| 4,700,424 | A | * | 10/1987 | Hagen | ...................... 15/250.04 |
| 5,509,606 | A | * | 4/1996 | Breithaupt et al. | ......... 239/130 |
| 5,957,384 | A | | 9/1999 | Lansinger | |
| 6,029,908 | A | * | 2/2000 | Petzold | ..................... 239/284.1 |
| 6,032,324 | A | | 3/2000 | Lansinger | |
| 6,133,546 | A | * | 10/2000 | Bains | ......................... 219/202 |
| 6,164,564 | A | * | 12/2000 | Franco et al. | ............ 239/284.1 |
| 6,364,010 | B1 | | 4/2002 | Richman et al. | |
| 6,615,438 | B1 | * | 9/2003 | Franco et al. | ............. 15/250.02 |
| 6,669,109 | B2 | * | 12/2003 | Ivanov et al. | ............. 239/284.1 |
| 6,789,744 | B2 | * | 9/2004 | Bissonnette et al. | ........ 239/135 |

OTHER PUBLICATIONS

Jacobs Electronics Safe–Vue Heater Brochure, pp. 1–4, at least as early as Jun. 28, 2002.
1 page Valeo OPTI–Wash spec sheet, date unknown.
3 page website, www.aaro.ca/BreakingNews/Sep26–Oct17–01NwsBfs.html. posted Oct. 1, 2001.
4 page installation and owner's manual, SAFE–VUE HEATER, Kit #250–6652, Rostra Precision Controls, Inc., date unknown.
1 page website, www.buyhotshot.com/choos.asp!ins=2., date unknown.
4 page website, www.buyhotshot.com/faq.asp!ins=8., date unknown.
Bennett, "Hot water clears icy windshields," 2 pages, Free Press, date unknown.
2 page website, www.theautochannel.com/news/2001/09/20–29185html., "Valeo Maximizes Driver Visibility With OPTI–Wash Heated Wash System", date unknown.
1 page website, www.ai–onlinee.com/issues/articledetail.asp?id=22., Dec. 2002.
Buchholz, "See and be seen with Valeo Technologies," AEI, Mar. 2003.

* cited by examiner

Primary Examiner—David A. Scherbel
Assistant Examiner—Darren Gorman
(74) Attorney, Agent, or Firm—Watts Hoffmann Co., LPA

(57) ABSTRACT

Apparatus and method for providing a heated cleaning fluid to a vehicle surface. The apparatus has an inlet port for receiving an amount of fluid; an outlet port for dispensing an amount of heated fluid; a heating element that heats up fluid passing from the inlet to the outlet; and a control circuit for energizing at least a portion of the heating element with a voltage to heat the fluid passing from the inlet to the outlet.

48 Claims, 7 Drawing Sheets

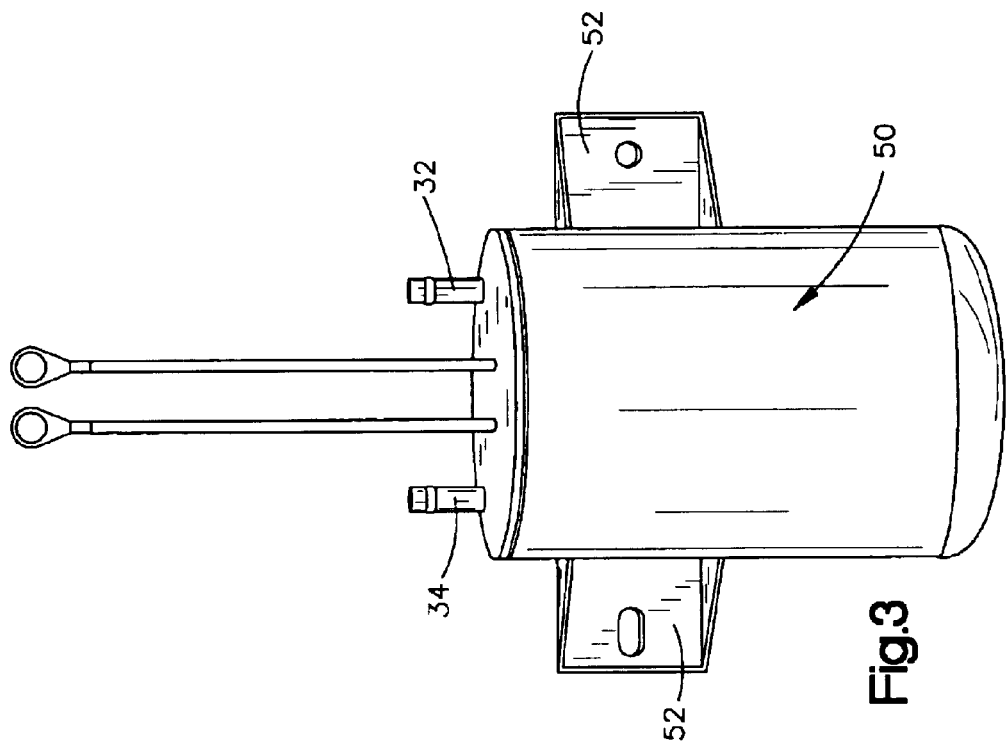
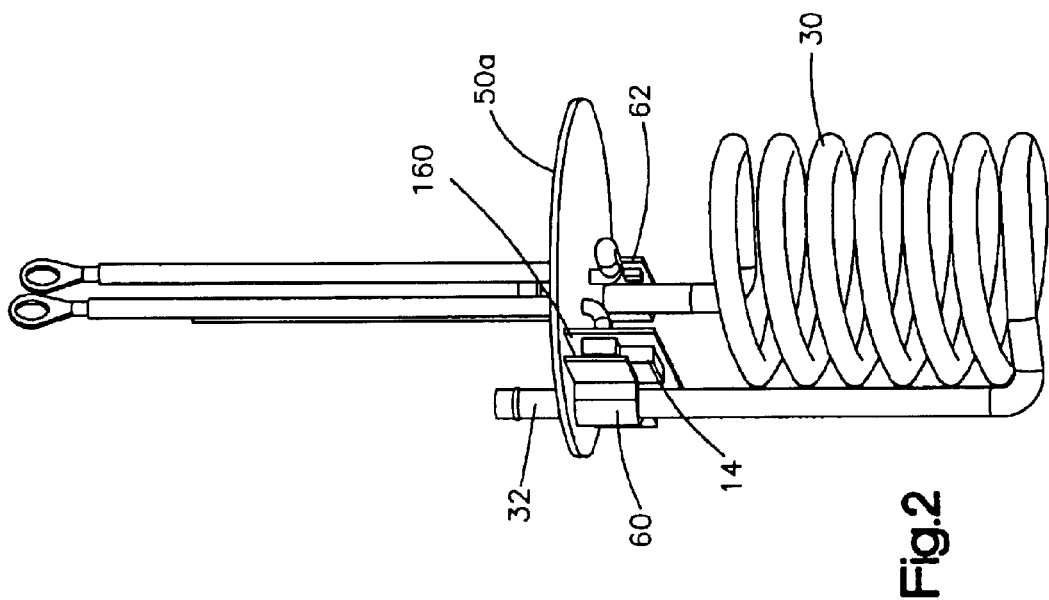

VEHICLE WINDSHIELD CLEANING SYSTEM

RELATE BACK

The present invention is a continuation in part of co-pending application Ser. No. 10/269,647, filed on Oct. 11, 2002, entitled Vehicle Windshield Cleaning System, which claims priority from provisional application Ser. No. 60/415,552, filed on Oct. 2, 2002.

FIELD OF THE INVENTION

The present invention concerns a windshield cleaning system, and more particularly to a windshield cleaning system that heats cleaning fluid applied to the windshield.

BACKGROUND ART

U.S. Pat. No. 6,364,010 entitled "Device to Provide Heated Washer Fluid" to Richman et al. concerns an apparatus and method for improving the cleaning and deicing effectiveness of a washer fluid in a motor vehicle before spraying it against a windshield, headlamps, etc, and utilizes the heat from the engine coolant to elevate the temperature of the washer fluid. U.S. Pat. Nos. 5,957,384 and 6,032,324 also concern de-icing of a windshield.

SUMMARY OF THE INVENTION

The invention concerns apparatus and method for providing a heated cleaning fluid to a vehicle surface. A system constructed with an exemplary embodiment of the invention has an inlet port for receiving an amount of fluid; an outlet port for dispensing an amount of heated fluid; a heating element that heats up fluid passing from the inlet to the outlet; and a control circuit for energizing at least a portion of the heating element with a voltage to heat the fluid passing from the inlet to the outlet.

In one embodiment, a reservoir is in fluid communication with the inlet port for storing a reserve of fluid. The reservoir increases the capacity of heated fluid that can be dispensed at a given time.

In one embodiment, the system prevents an unintended continuous application of power to the heating element. One version of this embodiment uses a fuse in communication with the heating element that will open after current flows to the heating element for a predetermined period of time.

In one embodiment, the application of power to the heating element is based, at least in part, on a voltage applied to the control circuit. For example, the heating element may be prevented from being energized when the applied voltage is outside a predetermined operating voltage range, if a crank signal is not first recognized, or the applied voltage drops.

In one embodiment, the system allows the cleaning fluid pump to be operated when the wiper motor is not operating. In one version of this embodiment, the wiper motor is disabled for a predetermined period of time, such as a first heat cycle, after energizing of the heating element.

In one embodiment, a control circuit of the system is disposed on a circuit board positioned adjacent to the heating element. This positioning allows the temperature of the heating element to be monitored or allows a heat dissipating device of the circuit to be used as a heating element.

In one embodiment, the system is used in a motor vehicle windshield washer system. The inlet port receives windshield washer fluid from the washer system and the outlet port delivers heated windshield washer fluid to nozzles that spray heated fluid onto a windshield. In an exemplary embodiment the delivery of high temperature fluid to the windshield can be accomplished in well under a minute after power is coupled to the heating element so that the windshield is quickly cleared of ice.

These and other objects advantages and features of the invention will become better understood from the following detailed description of one exemplary embodiment of the present invention which is described in conjunction with the accompanying drawings.

BRIEF DESCRIPTION OF THE DRAWINGS

FIG. 2 is a perspective view of an embodiment of the invention showing a heating assembly without an outside housing;

FIG. 3 is a perspective view of the FIG. 2 embodiment of the invention with a housing in place;

EXEMPLARY EMBODIMENT FOR PRACTICING THE INVENTION

Figure 1:
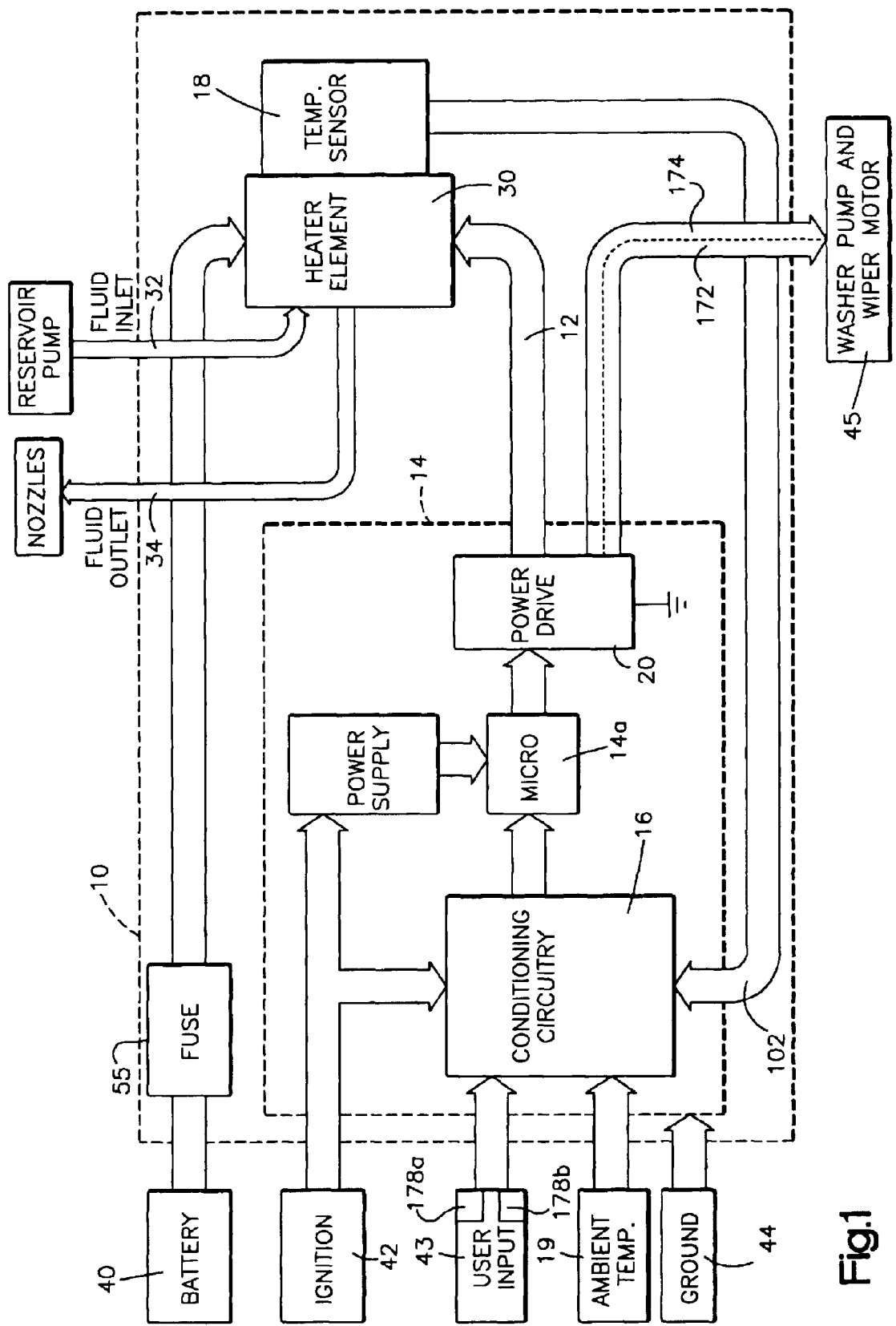
FIG. 1 is a block diagram schematic of a representative system for use with the present invention.

The drawings depict one embodiment of the present invention that concerns a washer control system 10 for use with a vehicle. In the disclosed exemplary embodiment of the invention the control system 10 is used in conjunction with a windshield washer apparatus. The control system 10 includes a control circuit 14 that includes an electronic output drive signal circuit 20 and an input signal interpretation or conditioning circuit 16.

The input signal interpretation circuit 16 electronically interfaces with at least one temperature sensor 18. In one embodiment of the invention, the temperature sensor provides output signals related to the temperature of the washer fluid supplied to windshield spray nozzles on the vehicle. In one embodiment of the invention, the control system also includes an electronic output circuit that drives output power control for at least one heating element 30 that applies heat to the windshield washer fluid. The illustrated module output is a "low side" type drive, meaning the module activates and deactivates the heater element by controlling the electrical circuit path to ground. In accordance with an alternate control system, an electronic output coupled to a vehicular communication bus makes available data for system diagnostics. An alternate control system could have an output drive that is a "high side" type. Another alternate control system could have both "high side" and "low side" type drives working together.

The exemplary control circuit 14 includes a programmable controller 14a that implements control algorithms for washer heater control output functions in response to vehicle input signals.

As seen in the functional schematic of FIG. 1, the control system 10 includes an electronic output 12 from the control circuit 14 for providing controlled current to the heating element 30. The control circuit 14 also includes an input signal interpretation circuit 16, or interface, to monitor input signals from, as one example, the temperature sensor 18. The temperature sensor 18 provides signals that allow for control of the amount of power delivered to the heating element 30. The controller monitors inputs from a vehicle battery 40, vehicle ground 44, and a vehicle ignition 42. In accordance with an alternate embodiment the controller also monitors ambient temperature by means of the temperature sensor 19. Furthermore, the controller provides output signals for controlling the heater element 30.

The exemplary control system also includes an electronic output circuit 20 to control power coupled to at least one heater element 30. In the exemplary embodiment, the heater element 30 heats windshield washer fluid as the fluid passes through the heating element 30. The illustrated heating element 30 include a length of stainless steel tubing with electrical connections 60, 62 (FIG. 2) electrically coupled to ends of the tubing. As seen in the Figures the system has an inlet 32 and an outlet 34. The inlet receives washer fluid from a fluid reservoir 35 of a motor vehicle and the outlet 34 delivers heated washer fluid to nozzles 37 mounted to the vehicle which direct the washer fluid against the vehicle surface, typically a windshield, lamp etc. The heating element 30 can be constructed from other metals such as brass and the like having electrical resistivity properties such that they sufficiently resist current flow to generate the required heat. In FIG. 2 a stainless steel tube is shown coiled to reduce the overall length of the tube and the size of the heating system. Alternative embodiments could have the heater element in other bent or un-bent shapes such as serpentine or straight tube configurations. The heating element of FIG. 2 has an uncoiled length of approximately 4 to 5 feet and is constructed of $5/16$ inch diameter stainless steel tubing. When coiled to the configuration shown in FIG. 2 the coiled heating element has an inside diameter of 1 and $11/16$ inch.

Figure 5:
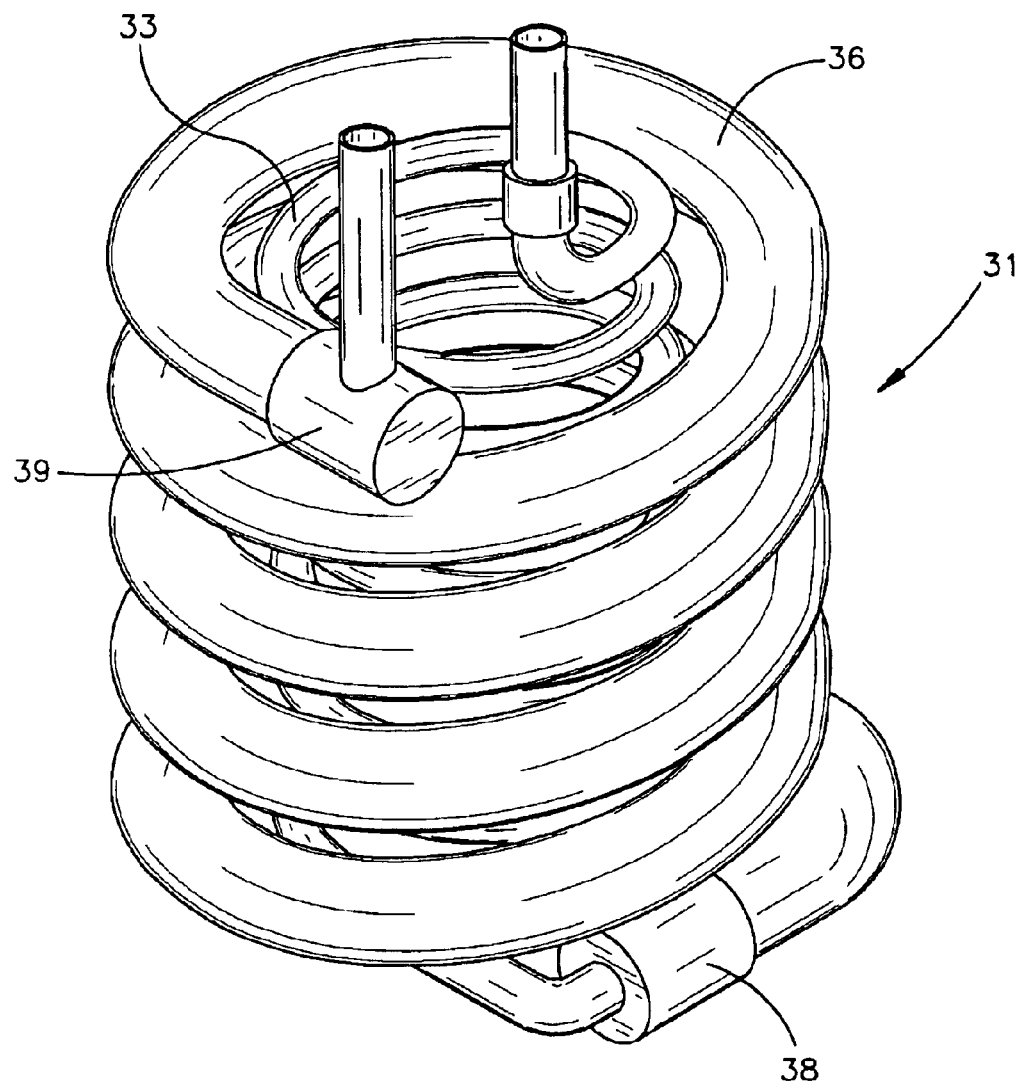
FIG. 5 is a perspective view of an alternative heating element from the heating element depicted in FIG. 2.

FIG. 5 depicts an alternative embodiment of a heating element 31 made up of two serially connected coiled tubes 36, 33. A fluid tight engagement between the two tubes 36, 33 is accomplished by a coupling 38 having openings sized to accommodate the two tubes 36, 33. This alternate heating element 31 has an inlet for routing cleaning fluid into the larger tube 36 by means of an electrically conductive coupling 39. The first, larger diameter tube 36 is constructed from copper and has an outer diameter of approximately $5/8$ inches. It is coiled to an inside diameter of 2 and $3/8$ inches. The second smaller diameter tube 33 is connected to an outlet that routes heated cleaning fluid to nozzles or the like. The second diameter tube 33 is constructed of stainless steel having the same $5/16$ inch diameter as the heating element of FIG. 2. This inner tube 33 is coiled to an inside diameter of 1 and $11/16$ inches.

An energizing signal is applied to the ends of the series connected coils so that current passes through both tubes 36, 33. The stainless steel coil 33 has a higher resistivity and therefore heats to a higher temperature more quickly. The outer larger diameter copper coil is heated by some resistance heating but also by conduction heating from the first inner coil 33. Both coils in this embodiment are surrounded by insulation within a housing.

Figure 6:
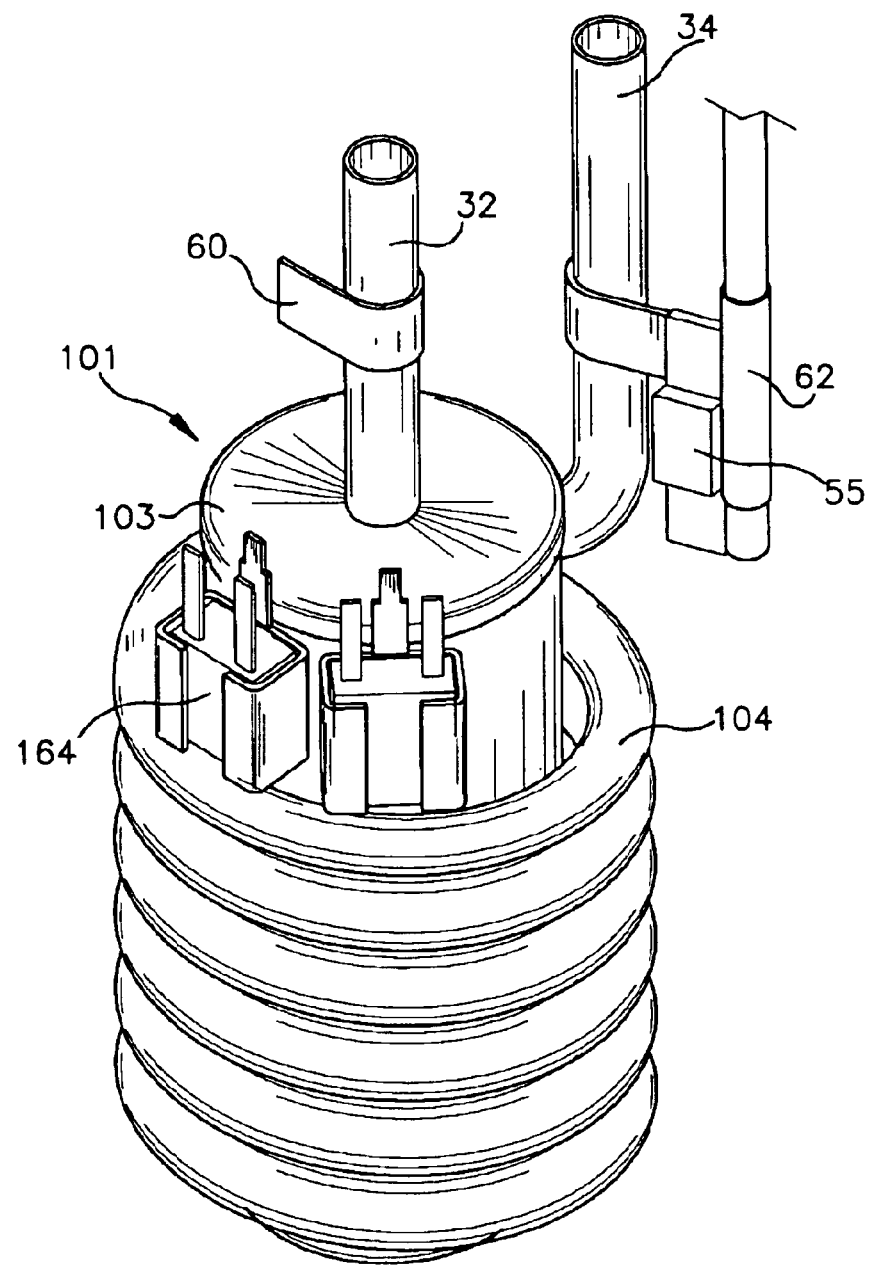
FIG. 6 is a perspective view of an alternative heating element from the heating element depicted in FIG. 2.
Figure 7:
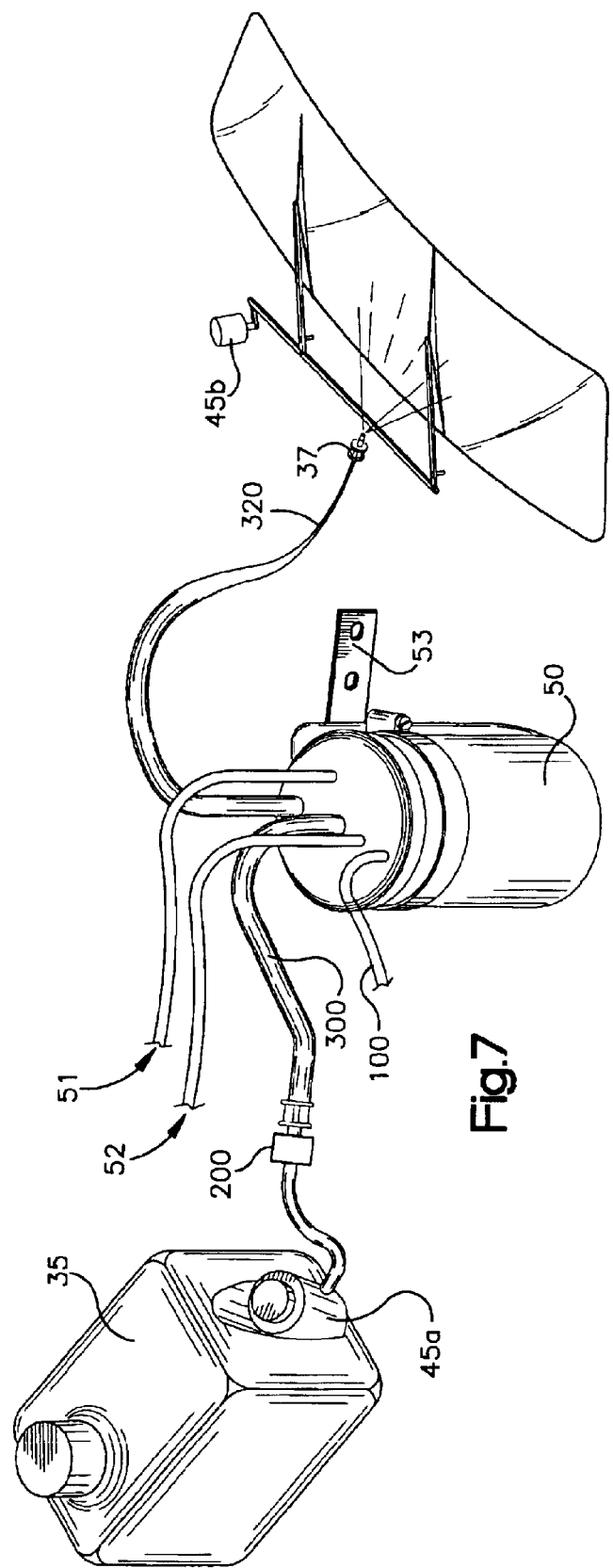
FIG. 7 is a perspective view of a heating assembly coupled to a fluid pump.

FIGS. 6 and 7 depict another alternative embodiment of a heating element 101 made up of a central reservoir 103 and a serially connected coiled heater tube 104. A fluid tight engagement between the reservoir and the coiled heater tube is accomplished by coupling the tube and the reservoir by silver soldering or welding. Fluid is routed from vehicle reservoir 35 through flexible tubing 300 into the central reservoir 103 by means of an electrically conductive coupling. The central reservoir 103 is constructed from a length of copper tubing and has an outer diameter of approximately 1½ inches. Alternately, the central reservoir could be constructed from brass or other electrically conductive materials. It is realized that the more resistive the material, the more resistance heating will occur, adding to the heating of fluid in the central reservoirs The coiled heater tube 104 is constructed of stainless steel having a $5/16$ inch diameter. The smaller diameter tube 104 is connected to an outlet 34 that routes heated fluid to nozzles or the like. This outer tube is coiled to an inside diameter of 1 and $11/16$ inches.

In the illustrated embodiment, an energizing signal is applied to the ends of the series connected central reservoir 103 and heater tube 104 so that current passes through both the reservoir 103 and the tube 104. The stainless steel coiled heater tube 104 has a higher resistivity than the copper central reservoir 103 and therefore heats to a higher temperature more quickly. The inner larger diameter brass reservoir is heated by some resistance heating but mainly by conduction heating from the coil. The reservoir 103 and heater tube 104 in this embodiment are thermally coupled together by an encapsulant 105 (see FIG. 8) within the housing to provide better heating of the reservoir 103 by the heater tube 104. Both elements in this embodiment are surrounded by insulation within the housing 50. A preferred encapsulant is S7252 commercially available from Epic Resins.

As shown in FIG. 3, all three of the embodiments of the invention are packaged in a housing 50 that encloses one of the heaters 30, 31, 101 of the alternate embodiments and is located in the engine compartment of the vehicle. Flanges 52 extend from sides of the housing 50 to allow the housing to be attached to a wall of the vehicle engine compartment in one embodiment. FIG. 7 shows an alternate attachment method using a band clamp 53 with a mounting tab. FIG. 2 represents one of the embodiments of the disclosed invention shown in FIG. 3 without the housing 50. Now referring to FIG. 2, the electrical connections 60 and 62 are shown on the ends of the given length of heating element 30. Similar connections are coupled to the ends of the series connected tubes of FIG. 5 and the series connected reservoir 103 and tube 104 of FIG. 6. In accordance with one embodiment of the invention, as fluid passes through the heating element tube, the fluid is heated according to the amount of power applied to the tube, the fluid flow rate, and ambient temperature. The programmable controller 14 constructed in accordance with the exemplary embodiment of the invention also implements control algorithms for washer heater control output functions in response to vehicle input signals. As washer fluid temperature changes due to ambient temperature changes, battery voltage changes, and such, the amount of applied heat is increased or decreased in order to maintain a washer fluid at or near a target temperature.

Controller Schematics

Figure 4:
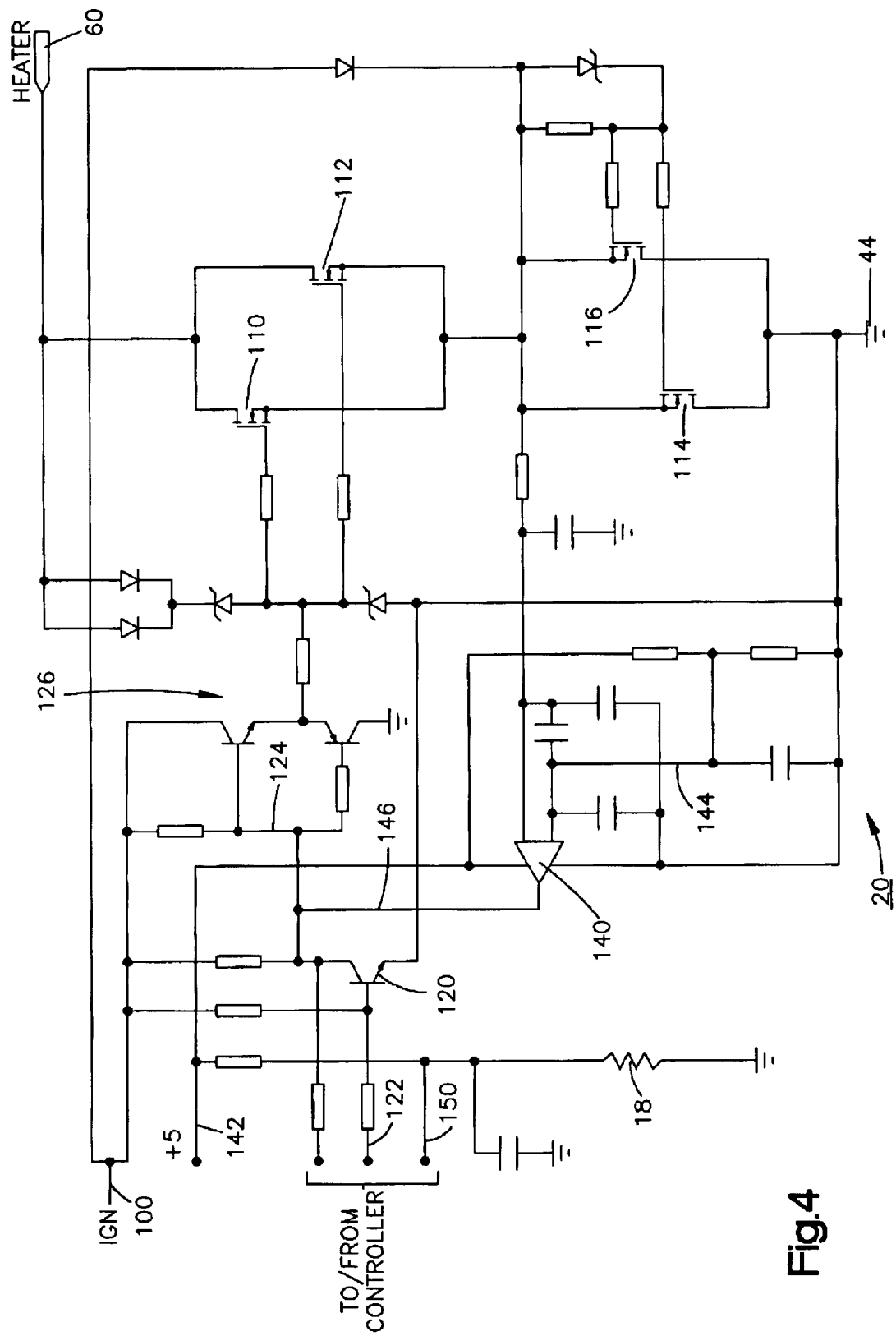
FIG. 4 is a schematic diagram of a drive circuit coupled to a fluid heating element that forms part of the FIG. 2 heating assembly.

The system block diagram shown in FIG. 1 and the more detailed schematic of FIG. 4 depict operation of the control system 10. External electrical connections include Battery 51, Ground 52, and Ignition 100. The Battery input connection 51 provides the voltage supply needed by the control system 10. This connection allows the high current flow required by the heating element. The Ground connection 52 provides the current return path to the battery negative terminal. This ground connection allows the high current flow required by the heating element plus the requirement of the control system 10. A fuse 55 (FIG. 6) is located in series with the battery connection and the heater element. An Ignition input 100 provides power to the controller. The battery voltage is monitored by the controller 14 to determine if there is sufficient voltage present to allow the control system to operate.

An input 102 from the temperature sensor 18 in physical contact with the heating element 30 is directly related to washer fluid temperature. Washer fluid temperature is monitored by using a temperature sensor such as a thermistor, RTD, or the like. The washer fluid is monitored non-invasively by attaching the temperature sensor to the stainless steel tube of the heater. The temperature of the tube corresponds to the temperature of the fluid within the tube. Alternatively the fluid temperature could be monitored invasively by placing a temperature sensor directly into the fluid through a threaded fitting or other suitable attachment method.

Operation

The controller receives a wake-up command signal from the Ignition input 100. When the Ignition input is above a predetermined voltage, the controller 14 drives one end of the heater element 30, the series connected tubes of the heater 31 or the reservoir and tube of the heater 101 low if the following are true:

1. The ignition voltage is greater than a first predetermined level and less than a second predetermined level.
2. The sensed Heater element temperature is less than a predetermined level.
3. The voltage on the ignition has a negative and positive voltage transition indicating a crank cycle has occurred.

An output driver 20 depicted in greater detail in FIG. 4 grounds one end of the heater for a maximum of four seconds after starting the heating cycle. The output driver will then begin applying power to the heater at a rate of fifty-five cycles per second by means of a pulse width modulated output as to maintain the temperature of the fluid. The fuse 55 is located between the battery connection and the heater element internal to the housing 50 in the illustrated embodiment. The fuse is purposely underrated so that at normal current flow the fuse will open after a given time period has elapsed. In normal operation the control will not allow current to flow for more than ten seconds continuously if the applied power is 80% of the power rating of the heater or greater. After the ten second on time has elapsed, there will be a thirty second off time imposed by the controller on the system regardless of fluid temperature. This will ensure that the fuse does not overheat and open, disabling operation. In the event of a FET driver shorting causing power to be applied continuously, the fuse 55 will open after a sufficient amount of time has passed causing heating of the fuse and subsequent opening of the fuse. In the exemplary embodiment of the invention, the desired heater temperature is predetermined to be 150 degrees Fahrenheit. The output driver 20 will remain active as long as the ignition voltage is still above a predetermined voltage. When the ignition is turned off, the controller is deactivated.

Turning now to FIG. 4, the output circuit 20 is depicted in greater detail. A heater connection 60 is shown in the upper right hand portion of the FIG. 4 depiction. This connection is grounded by means of initiating conduction of two FET power transistors 110, 112 which provide a current path to ground from the heater connection 60 to the ground connection 44 through a pair of reverse polarity protection FET transistors 114, 116. In an alternate embodiment, the reverse voltage FET's are omitted. The two transistors 110, 112 are turned on or rendered conductive by means of a pre-drive transistor 120 that is coupled to an output 122 from the microprocessor controller 14*a*. First consider a high output from the controller 14*a* at this output 122. This turns on transistor 120 that pulls an input 124 of a totem pole transistor combination 126 low. This signal turns on a lower of the two transistors of the totem pole combination to send activation signal that turns off the two FETs 110, 112.

When the controller provides a low output from the controller 14*a* at the output 122, the transistor 120 turns off and pulls an input 124 to a totem pole transistor combination 126 high. This signal turns on an uppermost of the two transistors of the totem pole combination to send an activation signal that turns on the two FETs 110, 112.

In one embodiment, a comparator 140 monitors current through the transistors 114, 116 (and by inference the transistors 110,112) and deactivates the transistors in the event too high a current is sensed. A five volt signal that is supplied at an input 142 from a power supply (FIG. 1) provides a reference input 144 to the comparator 140. When the non-reference input exceeds the reference input due to a rise in the current through the transistors 110, 112 (and associated rise in the voltage across the transistors 114, 116) the output 146 of the comparator goes low and removes the input from the gate of the FETs 110, 112 that causes them to conduct. This low signal at the output 146 is also coupled to the controller so that the controller can respond to the over current condition. In an alternate embodiment, the current sense capability is omitted. This alternate embodiment may be employed when the system is sold as an aftermarket part.

In accordance with the exemplary embodiment of the invention a thermistor temperature sensor 18 is also coupled to the controller. A signal at a junction between the temperature sensor 18 and a resistor coupled to the five volt input 142 generates a direct current signal at an input 150 related to the temperature of the heater 30.

A preferred control circuit 14 is mounted to a printed circuit board 160 supported by a cover 50*a* of the housing. As seen in FIG. 2, the illustrated connector 60 is a bent metallic member that attaches to the heating element 30 in the vicinity of the printed circuit board 160 and is in physical contact with the circuit components on the printed circuit board. The connector 60 thereby not only acts as a path to ground for current passing through the heating element 30 but acts as a heat sink that transmits heat away from the printed circuit board to the tube of the heating element 30 in the region of the inlet where the reservoir pump 45*a* routes cleaning fluid into the tube. Once the connections to the heating element have been completed, the housing 50 is attached to the cover 50*a* and a phenolic foam core material (not illustrated) is placed into the housing. The material acts as an insulator to impede heat loss from the outer surface of the heating element.

The exemplary control circuit includes a microcontroller running at an internal clock frequency of 4.0 Megahertz. In the exemplary embodiment, the microcontroller 14*a* selectively energizes the heating element based on a voltage applied to the control circuit. This voltage may be the battery voltage and/or the ignition voltage. When the ignition input voltage goes high, the control circuit will power up, come out of reset, and wait for a crank signal. The crank signal is indicated by a reduction in ignition voltage followed by a voltage rise of a predetermined value. For example, the predetermined value of the voltage rise may by 1.5V. After a crank cycle is recognized, a start delay time is imposed by the controller to allow the vehicle's electrical system to become stable. After this start delay, the control circuit monitors the ignition voltage to determine if the ignition is above a minimum enable voltage. A temperature signal from the sensor 18 is also monitored to see if the temperature of the fluid is below a set point temperature. The output drive feedback signal is also monitored to ensure that the output is in the correct state. If all conditions are such that the output can be enabled, the output 122 to the transistor 120 is pulled low. This initiates fluid heating. Initially, the output drive is on 100% for a maximum on time or until the feedback temperature reading approaches a set point temperature. In the exemplary embodiment, the preset maximum on time is empirically derived to stay below the boiling point of the cleaning fluid. Subsequently the control will read the heating tube temperature and make a determination if power should be reapplied to the tube. If the sensed temperature is below the desired setpoint, the output will be re-enabled at a variable duty cycle so that the tube is heated to the setpoint goal temperature as quickly as possible without exceeding a maximum allowable overshoot temperature.

Normal operation consists of maintaining the fluid temperature at the desired setpoint temperature by varying the duty cycle at which voltage is applied across the tube. The output duty cycle changes based on how far the sensed temperature is below the set point temperature.

In the event of excessive current flow through the output, the output will automatically be disabled. In this event the signal at the output 146 from the comparator will go low. When this occurs the controller 14a disables the output to the transistor for a period of time equal to an output retry rate programmed into the controller 14a. If the fault condition is removed, normal operation of the temperature set point control is re-instituted. As noted above, the current sense capability is omitted in one embodiment.

In the event the operating voltage from the battery (and ignition) is too high or too low (16.5 and 8 volts respectively) the controller 14a disables the output for a timeout period. After the timeout period, if voltages conditions are within normal parameters, the controller again enables the output. The control will disable the heating element, if after a crank signal is recognized, there is a drop in voltage from the original sampled voltage after each of five heat cycles. This would indicate that the vehicle has stalled since the voltage is not being maintained and is decreasing with each heater enable cycle.

The exemplary system also incorporates a soft turn-on and turn-off of the heating element. The soft turn-on and turn-off is accomplished by a slow ramp up or down of the pwm signal from the microprocessor 14a that drives the heating element. The ramping of power reduces the amount of flickering that can be observed from the headlights. It is recognized that the FET drivers could be run linearly (instead of pulse width modulated) to accomplish the soft turn-on and turn-off of the heating element. It is also recognized that the FET drivers could be run linearly to regulate the temperature of the heating element. It is further recognized that if the FET drivers are run linearly they will produce quantities of heat that will aid in the heating of fluid in the system.

Alternative Embodiments

Additional features of the invention adapted for use with a motor vehicle can be realized as described below. These embodiments have the same electrical configuration and operate in the same manner as the preferred embodiment.

One alternative embodiment of the invention uses a communications interface to transmit ambient temperature, battery voltage, and engine running information to the controller.

An alternate embodiment could include electronic input and/or output circuitry to interface with at least one ambient air temperature sensor 19 that provides output signals related to a sensed state of ambient air temperature.

Another embodiment of the invention could use engine coolant to heat the washer fluid prior to flowing through the heating element. This will reduce the amount of power required to heat the fluid to predetermined temperature using the heating element.

Figure 8:
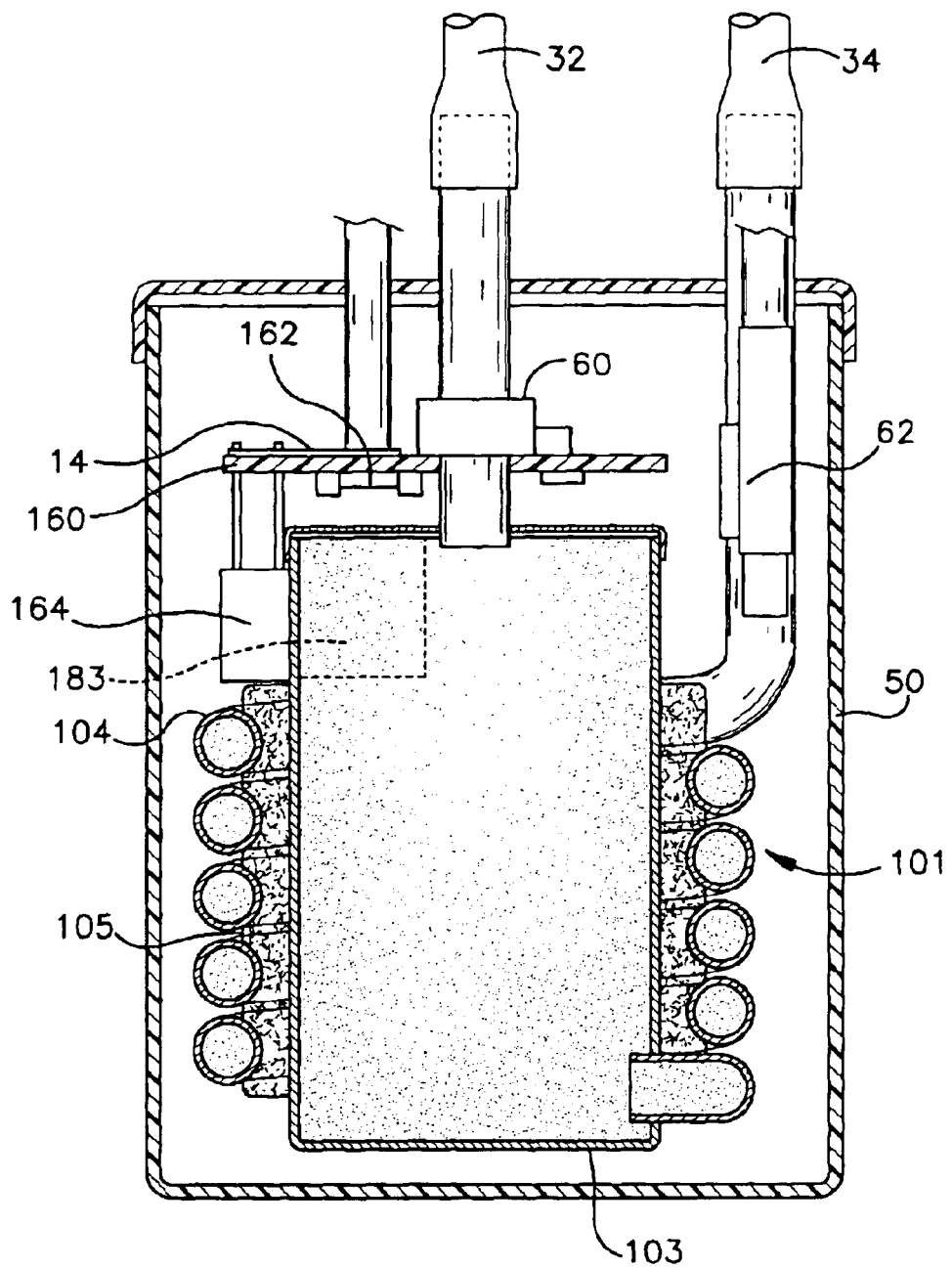
FIG. 8 is a sectional view of a heating assembly including the heating element illustrated by FIG. 6.

In the embodiment illustrated by FIGS. 6 and 8, the control circuit is disposed on a circuit board 160 positioned adjacent to the heating element 101, promoting heat transfer between the control circuit 14 and the heating element 101. A thermal fuse 162 on the printed circuit board 160 is in close proximity to the heating element. In the event that the heating element temperature surpassed a predetermined threshold, the fuse would open and disable the output drive. The control circuit 14 illustrated in FIGS. 6 and 8 includes one or more heat dissipating devices 164 mounted to the printed circuit board. In one embodiment, a heat dissipating device 164 of the control circuit is mounted to a heating element to provide additional heating of the fluid. One such heat dissipating device is a FET transistor that drives the heating element. In the embodiment illustrated by FIG. 6 a heat dissipating device 164 is mounted to the reservoir 103. A heat dissipating device 164 could also be is mounted to a coil of one of the heating elements 30, 31, 101.

Another embodiment of the invention could use a time varying signal from the vehicle alternator to determine if the engine is running. This could be used in conjunction with the ignition input or as a stand-alone signal eliminating ignition input.

Another embodiment of the invention could use the washer pump 45a to regulate the temperature of the washer fluid. In this embodiment the system would control the washer pump 45a as well as the heating element. When the controller receives a request for washer use, the output driver would activate, heating the fluid with the heating element. When the washer fluid was at temperature the washer pump would be enabled. After the volume of heated fluid was used the pump would be disabled, and the fluid would again start heating to a predetermined level. After the fluid achieves the desired temperature level the pump would again be activated.

In one embodiment, the control circuit 14 includes an output 172 that controls the washer pump 45a and separate output 174 that controls the wiper motor 45b. This allows the control circuit to disable the wiper motor 45b for a predetermined period of time after energizing the heating element and/or applying the heated fluid. For example, the control circuit could disable the wiper motor during the first heat cycle after initialization. This would allow for the heated fluid to have a more significant impact on surface contamination such as frost before the wipers are activated.

Another embodiment would have a separate user input devices 178a, 178b for independent control of the washer pump 45a and the wiper motor 45b respectively. The user could then spray heated fluid on the windshield as required for cleaning independent of wiper action which tends to force heated fluid from the windshield and thins the remaining liquid film causing more rapid cooling of the liquid that is left on the windshield.

Another embodiment would have an auxiliary heating element on the inner copper reservoir 103. This would allow for more direct heating of the fluid contained in the reservoir as compared to the conduction heating of the fluid by the outer coil through the encapsulant material. This would also allow for the outer coil to be disabled when the system has been in a mode of operation that only sustains the temperature of the fluid. This would allow for a lower power heat source to be enabled over longer periods of time, compared to the high power very short duration pulses that are applied to the main heater coil. Decreasing the high current requirements would decrease the wear on the vehicle's electrical system. It is further realized that the auxiliary heating could come from the FET transistors that drive the heating element.

Similarly, another embodiment would have an auxiliary heating element 183 in the inner brass reservoir. This would allow for more direct heating of the fluid contained in the reservoir as compared to the conduction heating of the fluid by the outer coil through the encapsulant material. This would also allow for the outer coil to be disabled when the system has been in a mode of operation that only sustains the temperature of the fluid. This would allow for a lower power heat source to be enabled over longer periods of time, compared to the high power very short duration pulses that are applied to the main heater coil. Reducing the high current requirements would decrease the wear on the vehicle's electrical system.

Another embodiment would have two different heat modes, the first having a higher power, the second a lower power. The two modes of operation could be used based on ambient temperature conditions. If, for example, it were below 40 degrees Fahrenheit where frost could be present on a vehicle windshield, the unit would use high power mode to heat fluid quickly to aid the operator in its removal. Alternately, if ambient temperature were say 40 degrees Fahrenheit or greater, a lower power mode would be used. This would allow for heating of fluid to aid in the cleaning of the windshield, but at a slower heating rate. This would decrease wear on the vehicle's electrical system when fast heating times are not required. The lower power is achieved by having a lower duty cycle on the heater drive. It is understood that the decision to switch from a power level to another power level could be accomplished with an external jumper or switch. This would provide the user with means for controlling the power applied to the heater. It is also understood that the external switch or jumper could cause the selection of other functions or characteristics.

Another embodiment could have a multiplicity of reservoir tanks connected in series or parallel combination. This would give increased available volume of heated fluid. Alternately, instead of having multiple reservoir tanks connected in one unit, multiple units could be connected together forming a system. Another alternate configuration would be the invention in conjunction with windshields that have self-heating capabilities, such as those with a translucent oxide coating enabling electrical current to flow from one end of the glass to the other creating heat due to the resistance of the coating. Another embodiment could use a flow switch 200 to determine when to heat the fluid. The control would activate the output driver when flow is detected so that the fluid is heated only when there is a demand.

An alternative embodiment could use two fluid temperature sensors, one at the heater element inlet and the other at the heater element outlet. When the heater is in operation and fluid is flowing, there should be a temperature differential across the heater element. That is, a fluid of a given temperature goes into the heater element, and warmed fluid exits the heater element. If the control used the washer motor voltage as an input to initiate a heating cycle, the two fluid temperature sensors could be used to determine that fluid flow exists. If there is a temperature differential, there would be flow. If there were a minimal or negligible temperature differential, a zero or low flow condition would be indicated. In the event of a low or zero flow condition, the heating element would be de-energized.

Another embodiment could have a diagnostic output that could be used for evaluating system performance and for diagnosing system faults. Operational parameters will be sent via serial communications using a proprietary bus. A computer could be connected to the module using an appropriate interface cable to allow for reading and interpreting data. In addition to reading data for diagnostics, the invention could include communications and interface means to allow for programming of the microcontroller after the assembly of the device is complete. This would allow for software upgrades on units that have finished the manufacturing process. Another embodiment could include control of the windshield wiper motor and washer pump. A separate switch input 43 (FIG. 1) would activate a cycle to dispense the fluid.

Another embodiment could include control of the windshield wiper motor and washer pump. A switch input would activate an automatic cycle to dispense the fluid.

In another embodiment, the module would control delayed wiper functions and would also have a switch input for one-touch control of the wiper motor and washer pump for spraying of washer fluid in an automatic wash cycle with an automatic wash cycle consisting of a given number of washer pump cycles and given number of wiper motor excursions. It is understood that cycle counts and motor excursions could be substituted for given times.

While the invention has been described with a degree of particularity, it is the intent that the invention includes all modifications and alterations from the disclosed design falling within the spirit or scope of the appended claims.

What is claimed is:

1. Apparatus for providing a heated cleaning fluid to a vehicle surface comprising:
   a) an inlet port for receiving an amount of fluid;
   b) a reservoir in fluid communication with the inlet port for storing fluid which enters a reservoir interior from the inlet port;
   c) an outlet port in fluid communication with the reservoir for dispensing an amount of heated fluid;
   d) a heating element for heating fluid that passes from the reservoir to the outlet; and
   e) a control circuit for energizing at least a portion of the heating element with a voltage to heat the heating element and the fluid passing from the inlet to the outlet.

2. The apparatus of claim 1 wherein the heating element is external to the reservoir.

3. The apparatus of claim 1 wherein the heating element is an electrically conductive tube through which fluid passes from the inlet port to the outlet port.

4. The apparatus of claim 3 wherein the electrically conductive tube surrounds the reservoir.

5. The apparatus of claim 3 wherein the electrically conductive tube is connected in series with the reservoir.

6. The apparatus of claim 1 wherein the heating element comprises a heat dissipating component of the control circuit.

7. The apparatus of claim 1 wherein the heating element is in direct contact with the reservoir.

8. The apparatus of claim 1 wherein the heating element is in thermal communication with the reservoir.

9. The apparatus of claim 1 wherein an additional heating element is internal to the reservoir.

10. The apparatus of claim 1 wherein the control circuit is disposed on a circuit board positioned adjacent to the reservoir and the control circuit includes a thermal fuse mounted to the circuit board in close proximity to the reservoir.

11. The apparatus of claim 1 wherein the control circuit is disposed on a circuit board positioned adjacent to the reservoir and the control circuit includes a heat dissipating device mounted to the circuit board and to the reservoir.

12. The apparatus of claim 11 wherein the heat dissipating device is a FET.

13. The apparatus of claim 1 further comprising insulation surrounding the reservoir to reduce heat loss from the reservoir.

14. Apparatus for providing a heated cleaning fluid to a vehicle surface comprising:
   a) an inlet port for receiving an amount of fluid;
   b) a reservoir in fluid communication with the inlet port for storing fluid which enters a reservoir interior from the inlet port;
   c) an outlet port for dispensing an amount of heated fluid;
   d) a heating element for heating fluid as it passes from the reservoir to the outlet port;
   e) a control circuit for energizing at least a portion of the heating element with a voltage to heat the heating element and the fluid passing from the inlet to the outlet; and
   f) an electrical fuse in communication with the heating element that will open after current flows to the heating element for a period of time.

15. The apparatus of claim 14 wherein the fuse is located between a battery and the heating element.

16. The apparatus of claim 14 wherein the electrical fuse opens when more than a predetermined percentage of a heating element rated power is applied to the heating element for more than a predetermined amount of time.

17. The apparatus of claim 14 wherein the control circuit includes a FET driver and wherein the electrical fuse opens as a result of shorting the FET driver.

18. Apparatus for providing a heated cleaning fluid to a vehicle surface comprising:
   a) an inlet port for receiving an amount of fluid;
   b) a reservoir in fluid communication with the inlet port for storing fluid which enters a reservoir interior from the inlet port;
   c) an outlet port for dispensing an amount of heated fluid;
   d) a heating element for heating fluid as it passes from the reservoir to the outlet port; and
   e) a control circuit for selectively energizing at least a portion of the heating element with a voltage to heat the heating element and the fluid passing from the inlet to the outlet based on a voltage applied to the control circuit.

19. The apparatus of claim 18 wherein the control circuit prevents energizing of the heating element when the voltage applied to the control circuit is outside a predetermined operating voltage range.

20. The apparatus of claim 19 wherein the operating voltage range is about 8 volts to about 16.5 volts.

21. The apparatus of claim 18 wherein the control circuit allows energizing of the heating element after a crank signal is recognized.

22. The apparatus of claim 21 wherein the crank signal is characterized by a reduction of the voltage applied to the control circuit followed by a rise of voltage applied to the control circuit.

23. The apparatus of claim 18 wherein the control circuit prevents energizing of the heating element when the voltage applied to the control circuit drops.

24. The apparatus of claim 18 wherein the control circuit prevents energizing of the heating element when the voltage applied to the control circuit signal drops after a crank signal is recognized.

25. The apparatus of claim 18 wherein the control circuit ramps up the voltage to the heating element over a predetermined period of time.

26. The apparatus of claim 18 wherein the control circuit ramps down the voltage to the heating element to stop energizing the heating element over a predetermined period of time.

27. Apparatus for providing a heated cleaning fluid to a vehicle windshield comprising:
   a) an inlet port for receiving an amount of fluid;
   b) a reservoir in fluid communication with the inlet port for storing fluid which enters a reservoir interior from the inlet port;
   c) an outlet port for dispensing an amount of heated fluid;
   d) a heating element for heating fluid as it passes from the reservoir to the outlet port;
   e) a wiper motor for selectively driving wiper blades; and
   f) a control circuit for selectively energizing at least a portion of the heating element with a voltage to heat the heating element and the fluid passing from the inlet to the outlet and including an output for controlling the wiper motor.

28. The apparatus of claim 27 wherein the control circuit disables the wiper motor for a predetermined period of time after energizing of the heating element.

29. The apparatus of claim 27 wherein the control circuit disables the wiper motor during a first heat cycle of the heating element.

30. The apparatus of claim 27 further comprising a first user input device coupled to the control circuit for controlling a washer pump and a second user input device for controlling the wiper motor coupled to said control circuit and wherein the washer pump and the wiper motor a controlled independently by the control circuit upon independent movement of the first and second user input devices.

31. Apparatus for providing a heated cleaning fluid to a vehicle windshield comprising:
   a) an inlet port for receiving an amount of fluid;
   b) a reservoir in fluid communication with the inlet port for storing fluid which enters a reservoir interior from the inlet port;
   c) an outlet port for dispensing an amount of heated fluid;
   d) a heating element for heating fluid as it passes from the reservoir and the outlet port; and
   e) a control circuit for selectively energizing at least a portion of the heating element with a voltage to heat the heating element and the fluid passing from the inlet to the outlet and for controlling the wiper motor, said control circuit being disposed on a circuit board positioned adjacent to said heating element.

32. The apparatus of claim 31 wherein the control circuit includes a thermal fuse mounted in close proximity to the heating element.

33. The apparatus of claim 31 wherein the control circuit includes a heat dissipating device mounted to the circuit board and to the heating element.

34. A method for providing a heated cleaning fluid to a vehicle surface comprising:
   a) coupling a fluid carrying tube and reservoir together to provide a combined fluid flow path;
   b) routing a cleaning fluid from a source of cleaning fluid into an inlet port of the combined fluid flow path of the tube and reservoir such that the fluid flows from the inlet into the tube and reservoir to an outlet port from the combined fluid flow path of the tube and reservoir;
   c) energizing a heating element with a voltage to heat the tube and reservoir and the fluid passing through the combined fluid flow path of the tube and reservoir; and
   d) directing the fluid from the outlet port to a nozzle for dispensing heated fluid against said surface.

35. A method for providing a heated cleaning fluid to a vehicle surface comprising:
   a) coupling a fluid carrying tube and reservoir together to provide a combined fluid flow path;
   b) routing a cleaning fluid from a source of cleaning fluid into an inlet port of the combined fluid flow path of the tube and reservoir such that the fluid flows from the inlet into the tube and reservoir to an outlet port from the combined fluid flow path of the tube and reservoir;
   c) energizing a heating element with a voltage to heat the tube and reservoir and the fluid passing through the combined fluid flow path of the tube and reservoir;
   d) opening a path from a source of said voltage to the heating element if current flows to the heating element for a period of time; and
   e) directing the fluid from the outlet port to a nozzle for dispensing heated fluid against said surface.

36. The method of claim 35 wherein the path opens when more than a predetermined percentage of a heating element rated power is applied to the heating element for more than a predetermined amount of time.

37. A method for providing a heated cleaning fluid to a vehicle surface comprising:
   a) coupling a fluid carrying tube and reservoir to provide a combined fluid flow path;
   b) routing a cleaning fluid from a source of cleaning fluid into an inlet port the combined fluid flow path of the tube and reservoir such that the fluid flows from the inlet into the tube and reservoir to an outlet port the combined fluid flow path of the tube and reservoir;
   c) selectively energizing a heating element with a voltage to heat the tube and reservoir and the fluid passing through the combined fluid flow path of the tube and reservoir based on an applied vehicle battery voltage; and
   d) emitting the fluid from the outlet port in fluid communication with a nozzle for dispensing heated fluid against said surface.

38. The method of claim 37 further comprising preventing energizing of the heating element when the battery voltage is outside a predetermined operating voltage range.

39. The method of claim 38 wherein the operating voltage range is about 8 volts to about 16.5 volts.

40. The method of claim 37 further comprising allowing energizing of the heating element after a crank signal is recognized.

41. The method of claim 40 wherein the crank signal is characterized by a reduction of the voltage applied by the battery followed by a rise of voltage applied by the battery.

42. The method of claim 37 wherein energizing of the heating element is prevented when the applied battery voltage drops.

43. The method of claim 37 wherein energizing of the heating element when the voltage is prevented when the applied battery voltage drops after a crank signal is recognized.

44. The method of claim 37 wherein the voltage to the heating element is gradually ramped up.

45. The method of claim 37 wherein the voltage to the heating element is gradually ramped down to gradually stop energizing the heating element.

46. A method for providing a heated cleaning fluid to a vehicle surface comprising:
   a) coupling a fluid carrying tube and reservoir together to provide a combined fluid flow path;
   b) routing a cleaning fluid from a source of cleaning fluid into an inlet port of the combined fluid flow path of the tube and reservoir such that the fluid flows from the inlet into the tube and reservoir to an outlet port from the combined fluid flow path of the tube and reservoir;
   c) energizing a heating element with a voltage to heat the tube and reservoir and the fluid passing through the combined fluid flow path of the tube and reservoir based on an applied vehicle battery voltage; and
   d) selectively emitting the fluid from the tube from the outlet port in fluid communication with a nozzle for dispensing heated fluid against said surface independent of operation of a wiper motor.

47. The method of claim 46 further comprising disabling the wiper motor for a predetermined period of time after energizing of the heating element.

48. The method of claim 46 further comprising disabling the wiper motor during a first heat cycle of the heating element.

* * * * *